US012627083B2

(12) United States Patent
Eberle-Goubet et al.

(10) Patent No.: US 12,627,083 B2
(45) Date of Patent: May 12, 2026

(54) CONNECTION ASSEMBLY, IN PARTICULAR FOR USE IN ELECTRIC VEHICLES OR HYBRID VEHICLES

(71) Applicant: Robert Bosch GmbH, Stuttgart (DE)

(72) Inventors: Klaus Eberle-Goubet, Rottenburg-Hailfingen (DE); Stefan Koch, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 18/554,667

(22) PCT Filed: Apr. 1, 2022

(86) PCT No.: PCT/EP2022/058746

§ 371 (c)(1),
(2) Date: Oct. 10, 2023

(87) PCT Pub. No.: WO2022/223264

PCT Pub. Date: Oct. 27, 2022

(65) Prior Publication Data

US 2024/0047902 A1 Feb. 8, 2024

(30) Foreign Application Priority Data

Apr. 20, 2021 (DE) ..................... 10 2021 203 915.4

(51) Int. Cl.
*H01R 4/34* (2006.01)
*H01R 4/70* (2006.01)

(52) U.S. Cl.
CPC ................. *H01R 4/70* (2013.01); *H01R 4/34* (2013.01); *H01R 2201/26* (2013.01)

(58) Field of Classification Search
CPC ......... H01R 4/70; H01R 4/34; H01R 2201/26
See application file for complete search history.

(56) References Cited

U.S. PATENT DOCUMENTS 1,509,068 A * 9/1924 Herron .................... F21V 21/30 362/40
5,203,724 A * 4/1993 Casey ...................... H01R 9/24 439/792

(Continued)

FOREIGN PATENT DOCUMENTS

DE 102016106620 A1 10/2016

OTHER PUBLICATIONS

Translation of International Search Report for Application No. PCT/EP2022/058746 dated Jul. 7, 2022 (2 pages).

*Primary Examiner* — Thanh Tam T Le
(74) *Attorney, Agent, or Firm* — Michael Best & Friedrich LLP

(57) ABSTRACT

A connection assembly (1) for use in electric vehicles or hybrid vehicles, comprising a first flat connection contact (11) for electrically contacting a first component (10) and a second flat connection contact (21) for electrically contacting a second component (20), wherein the first flat connection contact (11) and the second flat connection contact (21) overlap, and the first flat connection contact (11) and the second flat connection contact (21) are connected by means of a connection element (30). An insulating layer (40) is arranged between the connection element (30) and the first flat connection contact (11), said insulating layer electrically insulating the first flat connection contact (11) from the connection element (30), and/or an insulating layer (40) is arranged between the connection element (30) and the second flat connection contact (21), said insulating layer electrically insulating the second flat connection contact (21) from the connection element (30).

11 Claims, 1 Drawing Sheet

(56) References Cited

U.S. PATENT DOCUMENTS

| | | | | | |
|---|---|---|---|---|---|
| 5,876,224 | A * | 3/1999 | Chadbourne | H01R 25/142 | 439/121 |
| 6,855,012 | B2 * | 2/2005 | An | H01R 11/12 | 439/864 |
| 7,527,523 | B2 * | 5/2009 | Yohn | H01R 4/30 | 439/564 |
| 7,892,049 | B1 * | 2/2011 | Andler | H01R 4/34 | 439/883 |
| 8,047,868 | B1 * | 11/2011 | Korczynski | H01R 13/5213 | 439/522 |
| 9,106,011 | B2 * | 8/2015 | Bengtsson | H01R 43/205 | |
| 9,509,068 | B2 * | 11/2016 | Hansen | H01R 9/226 | |
| 9,553,397 | B2 * | 1/2017 | Eom | H01R 13/5205 | |
| 9,809,322 | B2 * | 11/2017 | Chrabascz | B64D 41/007 | |
| 9,985,362 | B2 * | 5/2018 | Arenburg | H01R 4/30 | |
| 10,439,303 | B2 * | 10/2019 | Boisnier | H01R 9/223 | |
| 10,512,154 | B2 * | 12/2019 | Kinoshita | H01R 4/34 | |
| 11,251,546 | B2 * | 2/2022 | Cumant | H01R 4/06 | |
| 11,329,408 | B2 * | 5/2022 | Watanabe | H01R 4/305 | |
| 11,417,973 | B2 * | 8/2022 | Reed | H01R 4/70 | |
| 11,512,730 | B2 * | 11/2022 | Cao | F16J 15/022 | |
| 11,749,917 | B2 * | 9/2023 | Belisle | H01R 4/36 | 439/709 |
| 11,881,664 | B2 * | 1/2024 | Belisle | H01R 25/145 | |
| 12,034,236 | B2 * | 7/2024 | Chvala | H01R 4/70 | |
| 12,288,953 | B2 * | 4/2025 | Yang | H01R 4/305 | |

* cited by examiner

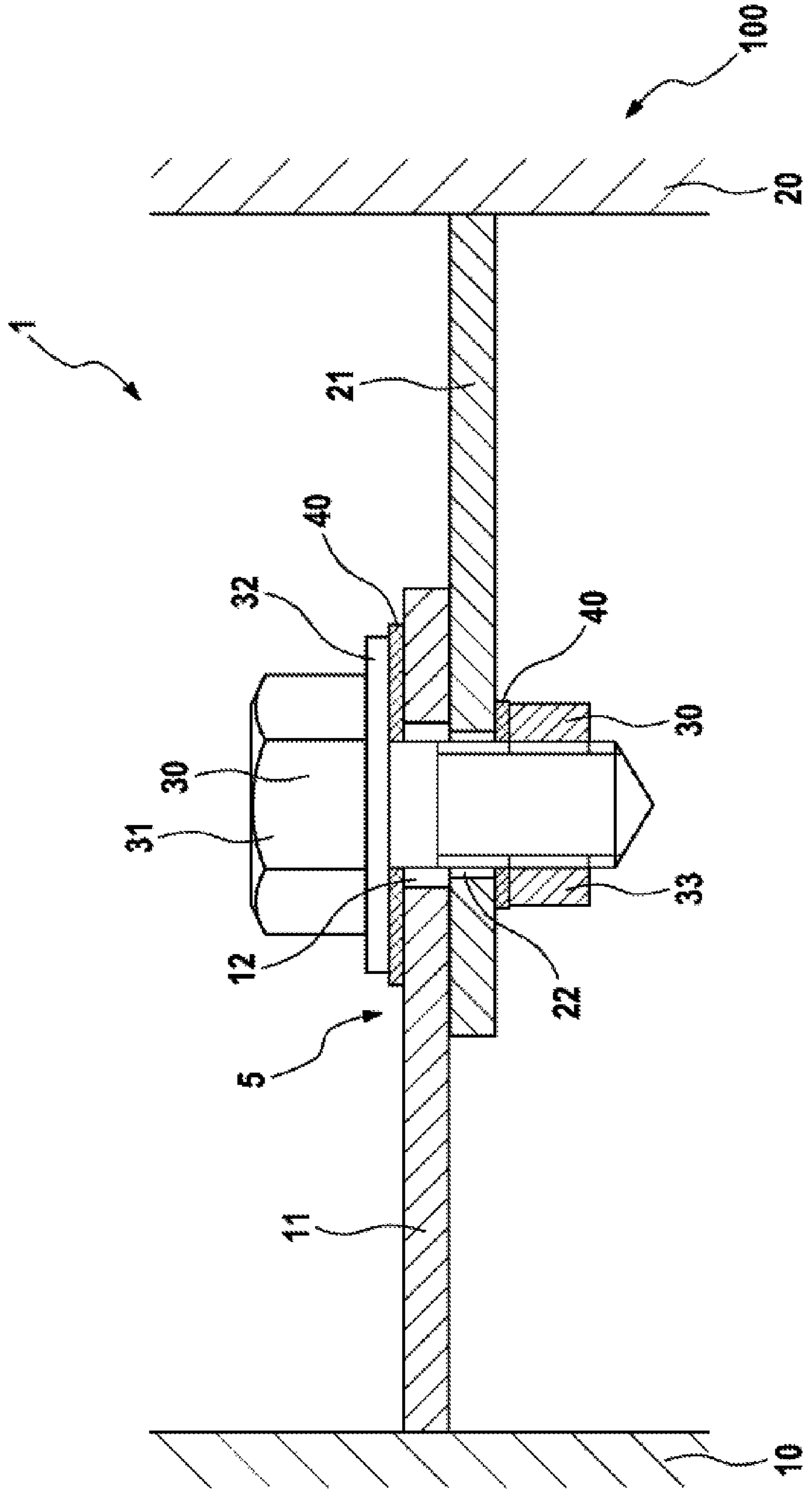
100
20
1
21
40
32
40
30
30
31
33
12
22
5
11
10

CONNECTION ASSEMBLY, IN PARTICULAR FOR USE IN ELECTRIC VEHICLES OR HYBRID VEHICLES

BACKGROUND

The invention relates to a connection assembly, in particular for use in electric vehicles or hybrid vehicles.

In power electronics, for example in electric vehicles or hybrid vehicles, electric and/or electronic components carrying high electric currents are connected to one another. Due to the high electric currents, current-conducting elements by which the electric and/or electronic components are connected must have correspondingly low electric resistances and thus large cross-sections and or materials with high electric conductive properties. For example, in such assemblies, power is supplied via power buses, which are also called busbars, and the electric and/or electronic components are connected to one another via power buses.

To connect electric and/or electronic components to one another, flat connection contacts, for example power buses or cable lugs, which form electric connections of the electric and/or electronic components, are electrically connected to one another. The flat connection contacts overlap and are connected to one another, for example screwed, in the region in which they overlap. When high currents flow over the connection, the maintenance of a low electric material resistance and the maintenance a low electric contact resistance is essential for minimizing the electric total conduction loss.

SUMMARY

According to the invention, a connection assembly, in particular for use in electric vehicles or hybrid vehicles, is proposed. The connection assembly comprises a first flat connection contact for electrically contacting a first electric and/or electronic component and a second flat connection contact for electrically contacting a second electric and/or electronic component, wherein the first flat connection contact and the second flat connection contact overlap in an overlap region and lie flatly one over the other in the overlap region, wherein the first flat connection contact and the second flat connection contact are connected in the overlap region by means of a connection element. According to the present invention, an insulating layer is arranged between the connection element and the first flat connection contact, said insulating layer electrically insulating the first flat connection contact from the connection element, and/or an insulating layer is arranged between the connection element and the second flat connection contact, said insulating layer electrically insulating the second flat connection contact from the connection element.

Compared to the prior art, the connection has the advantage that the connecting means are electrochemically insulated from the flat connection contacts. Thus, the risk of corrosion is advantageously reduced while ensuring a good and stable connection between the first flat connection contact and the second flat connection contact over the entire lifetime of the connection assembly. Furthermore, a good connection with low bias loss due to setting or creep behavior is ensured.

According to one advantageous embodiment, it is provided that the insulating layer is formed on the connection element and/or on the first flat connection contact and/or on the second flat connection contact. The insulating layer can, for example, be advantageously configured as a coating on the connection element and/or on the first flat connection contact and/or on the second flat connection contact. For example, the insulating layer can be formed in a material-locking manner on the connection element and/or on the first flat connection contact and/or on the second flat connection contact.

According to one advantageous exemplary embodiment, it is provided that the insulating layer is formed from a silicate and/or a phosphate and/or a nitride and/or an oxide. An insulating layer configured in this way separates the connection element electrochemically particularly well from the flat connection contacts. Thus, the risk of corrosion is advantageously reduced while ensuring a good and stable connection between the first flat connection contact and the second flat connection contact over the entire lifetime of the connection assembly.

According to one advantageous embodiment, it is provided that the connection element projects through a first recess in the first flat connection contact and through a second recess in the second flat connection contact, wherein the insulating layer is arranged around the first recess and/or around the second recess. An advantageously stable and good electric contact can be established between the two connection contacts by means of a connection element configured in this way. For example, the connection element indirectly abuts the connection contacts around the recess with the interposition of the insulating layer. The insulating layer thus separates the connecting means from the connection contacts and electrically insulates them from the connection contacts. Thus, a current flow between the connection element and the connection contacts is prevented, and thus galvanic corrosion is prevented in the region in which the connecting means indirectly abut the connection contacts.

According to one advantageous exemplary embodiment, it is provided that the connection element is configured as a screw connection element with a screw, and in particular with a screw bushing and/or a washer. The screw bushing can be a screw nut, for example. The insulating layer can be arranged between a head of the screw and the flat connection contacts, and/or the insulating layer can be arranged between the screw bushing and the washer and the flat connection contacts. The connection contacts can advantageously be connected to one another simply, fixedly, and releasably by means of a screw connection. The screw connection advantageously pushes the connection contacts in the overlap region on top of one another so that the connection contacts in the overlap region are electrically connected to one another. The screw connection advantageously comprises a screw having a head and a screw bushing. The screw bushing can be a screw nut, for example. The head of the screw indirectly abuts the first connection contact with the interposition of the insulating layer. The screw bushing indirectly abuts the second connection contact with the interposition of the insulating layer. Furthermore, a washer can be arranged between the head of the screw and the first connection contact and/or between the screw bushing and the second connection contact.

According to one advantageous embodiment, it is provided that the connection element is completely coated by the insulating layer. Thus, it is ensured in a simple manner that the connection element is electrically insulated from the connection elements by the insulating layer at all points where it could come into electrically conductive contact with the connection elements. Furthermore, the connection element completely surrounded by the insulating layer is electrically insulated from electrolytes, for example water with dissolved salts.

According to one advantageous embodiment, it is provided that the first flat connection contact and/or the second flat connection contact are formed from copper.

According to one advantageous embodiment, it is provided that the connection element is formed from steel.

According to one advantageous exemplary embodiment, it is provided that the first flat connection contact is configured as a power bus or as a cable lug and/or the second flat connection contact is configured as a power bus or as a cable lug.

Furthermore, according to the present invention, an electric and/or electronic assembly comprising a connection assembly according to the present invention is proposed. The electric and/or electronic assembly further comprises a first electric and/or electronic component and a second electric and/or electronic component, wherein the first flat connection contact is configured as an electric connection of the first electric and/or electronic component and the second flat connection contact is configured as an electric connection of the second electric and/or electronic component.

BRIEF DESCRIPTION OF THE DRAWINGS

An exemplary embodiment of the invention is shown in the drawing and explained in further detail in the following description. Shown are:

FIG. 1 a cross-section through an exemplary embodiment of the connection assembly according to the invention.

DETAILED DESCRIPTION

FIG. 1 shows a schematic view of an exemplary embodiment of the electric and/or electronic assembly 100 with an exemplary embodiment of the connection assembly 1. The connection assembly 1 can be used in all applications in which high currents must be conducted via contact connections and power losses must be kept low. For example, the connection assembly 1 can be used in systems that carry high currents, for example in power electronics, for example in electric vehicles or hybrid vehicles. For example, the connection assembly 1 can be used in power electronics, in transducers or batteries.

The connection assembly 1 comprises a first flat connection contact 11, which can be for example an electric connection of a first electric and/or electronic component 10. Furthermore, the connection assembly 1 comprises a second flat connection contact 21, which can be for example an electric connection of a second electric and/or electronic component 20. The electric and/or electronic components 10, 20 can be or can include, for example, inverters, converters, DC/DC converters, capacitors, for example DC-link capacitors, batteries, or, for example, other electronic and/or electric components that are used in electric vehicles or hybrid vehicles.

The first electric and/or electronic component 10 is electrically conductively connected to the second electric and/or electronic component 20. The electrically conductive connection between the first electric and/or electronic component 10 and the second electric and/or electronic component 20 is established via the flat connection contacts 11, 21. For this purpose, the first flat connection contact 11 is electrically connected to the second flat connection contact 21. For this purpose, the first flat connection contact 11 rests flatly, in particular directly, on the second flat connection contact 21.

The flat connection contacts 11, 21 are formed from an electrically conductive material, for example from a metal, for example from copper. Copper has an advantageously low material resistance. The first flat connection contact 11 can be formed from the same material as the second flat connection contact 21. However, the first flat connection contact 11 and the second flat connection contact 21 can also be formed from different materials. The flat connection contacts 11, 21 are formed flat at least in the region in which they overlap. The flat connection contacts 11, 21 have flat support surfaces in the overlap region 5, at which the flat connection contacts 11, 21 abut one another so that an electrically conductive connection is established between the flat connection contacts 11, 21. The flat connection contacts 11, 21 are arranged plan-parallel to one another with respect to their flat extension planes. In the exemplary embodiment shown in FIG. 1, the flat connection contacts 11, 21 are configured as power bars 11, 21. In the context of the present application, a power bus 11, 21 is understood to mean an electrically conductive flat conductor, for example an electrically conductive bar or strip. In FIG. 1, a cross-section perpendicular to the flat extension plane of the power bars 11, 21 is shown. A power bus can thus be a busbar, for example. For example, the power buses 11, 21 can be bent or curved or can also run in a curved or incremental fashion. The power buses 11, 21 are made of an electrically conductive material, for example a metal, for example copper. The power buses 11, 21 are formed integrally, for example. For example, the power buses 11, 21 are formed continuously from the same material. The power buses 11, 21 are configured as a stamped part, for example. In the exemplary embodiment shown in the FIGURE, each of the power buses 11, 21 has a thickness of the power buses 11, 21 that is constant over a longitudinal extension of the power buses 11, 21, for example perpendicular to the current direction. Furthermore, in the exemplary embodiment shown in the FIGURE, each of the power buses 11, 21 has a width of the power buses 11, 21 that is constant over a longitudinal extension of the power buses 11, 21, for example perpendicular to the current direction. Furthermore, the connection contacts 11, 21 can also be configured as cable lugs, for example.

As shown in FIG. 1, the connection assembly 1 further comprises a connection element 30. The connection element 30 establishes a mechanical connection between the first flat connection contact 11 and the second flat connection contact 21. In the exemplary embodiment shown in FIG. 1, the connection element 30 is configured as a screw connection element. For example, the connection element 30 comprises a screw 31 and a screw bushing 33. The screw bushing 33 is configured as a screw nut, for example. The screw 31 is passed through the connection contacts 11, 21 in the overlap region 5 in which the connection contacts 11, 21 overlap. For this purpose, a first recess 12 is formed in the first flat connection contact 11 and a second recess 22 is formed in the second flat connection contact 21. The screw 31 projects through the first recess 12 of the first flat connection contact 11 and through the second recess 22 of the second flat connection contact 21. In the recesses 12, 22, the screw 31 is spaced apart from the first flat connection contact 11 and from the second flat connection contact 21 and does not contact them. A head is formed at a first end of the screw 31. At the second end of the screw 31 facing away from the first end of the screw 31, a screw bushing 33 is screwed onto a threading of the screw 31. The screw 31 and the screw bushing 33 thus push the first flat connection contact 11 and the second flat connection contact 21 onto one another. The first flat connection contact 11 lies directly on the second flat connection contact 21, so that an electrically conductive connection is established between the two connection contacts 11, 21. As shown in the exemplary embodiment in FIG. 1, in addition to the screw 31 and the screw bushing 33, the connection element 30 can comprise one or more washers 32, which can for example be laid under the head of the screw 31 or under the screw bushing 33. The connection element 30 can be made of a metal, for example steel. Steel has an advantageously high e-model.

The connection element 30 is formed from a different material than the first flat connection contact 11 and/or the second flat connection contact 21. Components made of different materials that are in electrically conductive contact can become electrodes in a liquid medium. The liquid medium, for example water with salts dissolved therein, acts as an electrolyte. An electrochemical reaction takes place, which can lead to the corrosion of the connection assembly 1. In order to prevent corrosion, in the connection assembly 1 shown in FIG. 1, the electric contact between the flat connection contacts 11, 21 and the connection element 30 formed from a different material than the flat connection contacts 11, 21 is prevented. For this purpose, the connection assembly 1 comprises at least one insulating layer 40. The insulating layer 40 is arranged between the connection contacts 11, 21 and the connection element 30 and electrically insulates the connection elements 11, 21 from the connection element 30. For example, the insulating layer 40 can comprise a phosphate and/or a silicate and/or a nitride and/or an oxide. For example, the insulating layer 40 can be a continuous, contiguous layer. However, the insulating layer 40 can also be an insulating layer 40 divided into a plurality of separated regions. The insulating layer 40 can also comprise a plurality of layers arranged one on top of the other. The connection assembly 1 can also comprise a plurality of insulating layers 40. For example, the insulating layers 40 can be applied to the first flat connection contact 11 and/or to the second flat connection contact 21 and/or to the connection element 30 by physical vapor deposition (PVD), chemical vapor deposition (CVD), sputtering, currentless deposition, dip coating, or spray coating.

The insulating layer 40 can be applied locally on the first flat connection contact 11 and/or on the second flat connection contact 21 and/or on the connection element 30. If the connection element 30 is configured as a screw connection element as shown in the exemplary embodiment in FIG. 1, the insulating layer 40 can be arranged and/or applied to the head of the screw 31, the screw bushing 33, and/or the washer 32, for example. The insulating layer 40 can be arranged and/or applied locally limited on the screw 31, the screw bushing 33, and/or the washer 32. However, the insulating layer 40 can also completely coat the screw 31 and/or the screw bushing 33 and/or the washer 32.

Of course, further exemplary embodiments and mixed forms of the illustrated exemplary embodiment are also possible.

The invention claimed is:

1. A connection assembly (1) for use in electric vehicles or hybrid vehicles, comprising a first flat connection contact (11) for electrically contacting a first electric and/or electronic component (10) and a second flat connection contact (21) for electrically contacting a second electric and/or electronic component (20), wherein the first flat connection contact (11) and the second flat connection contact (21) overlap in an overlap region (5) and lie flatly one over the other in the overlap region (5), wherein the first flat connection contact (11) and the second flat connection contact (21) are connected in the overlap region (5) by means of a connection element (30), wherein an insulating layer (40) is arranged between the connection element (30) and the first flat connection contact (11), said insulating layer electrically insulating the first flat connection contact (11) from the connection element (30), and the insulating layer (40) is arranged between the connection element (30) and the second flat connection contact (21), said insulating layer electrically insulating the second flat connection contact (21) from the connection element (30).

2. The connection assembly according to claim 1, wherein the insulating layer (40) is formed on the connection element (30) and/or on the first flat connection contact (11) and/or on the second flat connection contact (21).

3. The connection assembly according to claim 1, wherein the insulating layer (40) is formed from a silicate and/or a phosphate and/or a nitride and/or an oxide.

4. The connection assembly according claim 1, wherein the connection element (30) projects through a first recess (12) in the first flat connection contact (11) and through a second recess (22) in the second flat connection contact (21), wherein the insulating layer (40) is arranged around the first recess (12) and/or around the second recess (22).

5. The connection assembly according to claim 1, wherein the connection element (30) is configured as a screw connection with a screw (31) and/or a washer (32), wherein the insulating layer (40) is arranged between a head of the screw (31) and the first and second flat connection contacts (11, 21) and/or the insulating layer (40) is arranged between the washer (32) and the flat connection contacts (11, 21) and/or the insulating layer (40) is arranged between the screw bushing (33) and the flat connection contacts (11, 21).

6. The connection assembly according to claim 1, wherein the connection element (30) is completely coated by the insulating layer (40).

7. The connection assembly according to claim 1, wherein the first flat connection contact (11) and/or the second flat connection contact (21) are formed from copper.

8. The connection assembly according to claim 1, wherein the connection element (30) is formed from steel.

9. The connection assembly according to claim 1, wherein the first flat connection contact (11) is configured as a power bus or as a cable lug and/or the second flat connection contact (21) is configured as a power bus or as a cable lug.

10. An electric and/or electronic assembly (100) comprising a connection assembly (1) according to claim 1, wherein the first flat connection contact (11) is configured as an electric connection of the first electric and/or electronic component (10) and the second flat connection contact (21) is configured as an electric connection of the second electric and/or electronic component (20).

11. The connection assembly according to claim 1, wherein the contact element (30) is spaced apart from and does not contact the first flat connection contact (11) and the second flat connection contact (12).

* * * * *